United States Patent [19]
Hesh

[11] Patent Number: 4,868,408
[45] Date of Patent: Sep. 19, 1989

[54] PORTABLE WATER-POWERED ELECTRIC GENERATOR

[76] Inventor: Frank Hesh, 1155 W. Ogden, Naperville, Ill. 60540

[21] Appl. No.: 243,829

[22] Filed: Sep. 12, 1988

[51] Int. Cl.⁴ .................................................. F03B 3/04
[52] U.S. Cl. ........................................ 290/52; 290/54; 416/85
[58] Field of Search ............................. 290/43, 52, 54; 415/2.1, 3.1; 416/9, 84, 85, 86, 93 R, 93 A, DIG. 4; 417/334, 337

[56] References Cited

U.S. PATENT DOCUMENTS

| | | | |
|---|---|---|---|
| 3,339,078 | 8/1967 | Crompton | 290/54 X |
| 4,163,904 | 8/1979 | Skendrovic | 290/54 |
| 4,219,303 | 8/1980 | Houton, Jr. et al. | 416/85 X |
| 4,274,009 | 6/1981 | Parker, Sr. | 290/54 X |
| 4,276,481 | 6/1981 | Parker | 290/43 |
| 4,392,063 | 7/1983 | Lindquist | 290/54 |
| 4,524,285 | 6/1985 | Rauch | 290/43 |
| 4,816,697 | 3/1989 | Nalbandyan et al. | 290/54 |

Primary Examiner—William M. Shoop, Jr.
Assistant Examiner—W. E. Duncanson, Jr.
Attorney, Agent, or Firm—Charles F. Lind

[57] ABSTRACT

The disclosed portable water-powered electric generator unit has a tubular form with opposite open inlet and outlet ends defining a longitudinal flow path for the moving stream water. The tubular form defines a converging venturi terminating at a throat between the inlet and outlet ends. An electric dynamo, having a sealed housing and external driving propeller means, is supported in the flow path downsteam of the throat, with the propeller means at the throat. The inlet end is between 2-5 times larger in area than the venturi throat, to speed up the water passing through the propeller means. The tubular form and housing together define a diverging venturi downstream from the throat, decelerating the water with minimal losses before exiting from the open outlet end. The open outlet end is 1.1-1.5 times larger in area than the open inlet end, whereby the slightly faster surrounding stream water blending with the exiting water at the open outlet end may tend to accelerate the exiting water slightly for added efficiencies. A buoyancy chamber, with remotely operated valve and gas pressure means, is on the portable electric generator unit to regulate its overall buoyancy, for adjusting its operative debth of use in the stream.

12 Claims, 1 Drawing Sheet

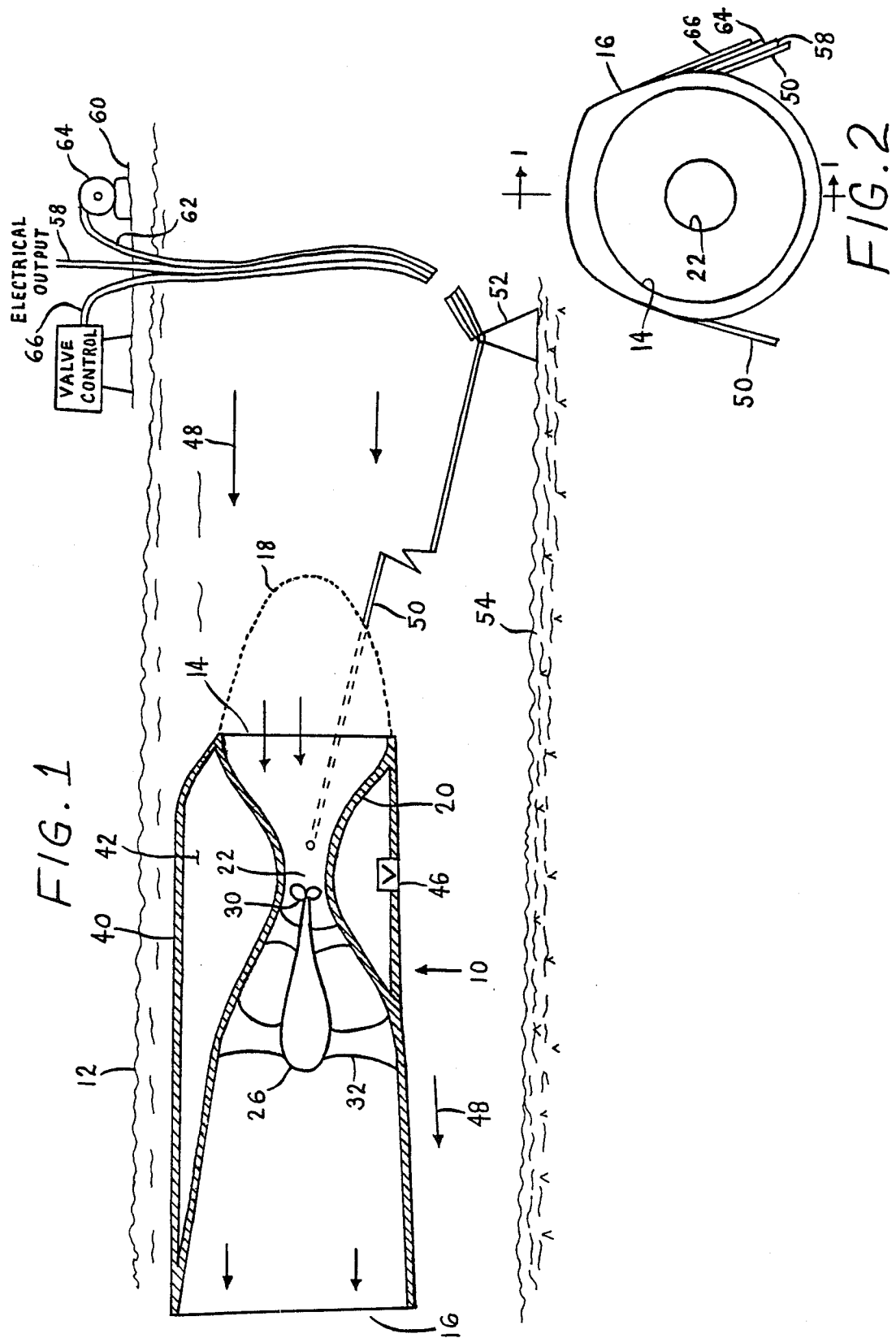

PORTABLE WATER-POWERED ELECTRIC GENERATOR

BACKGROUND OF THE INVENTION

Various portable generators have been proposed, to be moored in and powered by flowing water, to generate electricity that is usable at that location. Thus, a typical unit might be used in a river or stream having currents only of the order of 5-25 feet per second. The energy pick-up means, an impeller or propeller driven by the current, may be designed to operate efficiently off of kinetic energy conversion and/or off of potential energy conversion. However, as the total unit energy level will be relatively small, even a slight increase in the efficiency of the energy pick-up means becomes significant.

One type of portable generator is illustrated in the McLaughlin Pat. No. 868,798, having a generator mounted within a water-tight housing, and a shaft extended through seals in the housing and connected internally to the generator and externally to a propeller. The portable generator is moored by flexible nonextendable lines secured to separate anchors, to allow the generator to drag freely and directly in the water, and the water flows around the generator housing and over and through the propeller to generate electrical power.

A modified version of this type of portable generator is illustrated in the Souczek Pat. No. 2,501,696, where several generator housings are used, connected together on a winged structure; and the wing structure is connected to the anchored lines. The wing structure is operated to fly in the flowing water, to relocate the unit to different debths in the stream, as needed for passing vessels or the like. Another modified version of this type is illustrated in the Wracsaricht Pat. No. 4,306,157, where several multi-blade propellers are used.

Another type of portable generator is illustrated in the Vary et al Pat. No. 3,980,894, which has an open-ended flow tube, and the impeller and generator housing are mounted within the flow tube, to be actuated by the water flowing therethrough. One modified version further has ports midway along the tube that open toward a second set of impeller blades, and a scoop on the tube is used to direct water flow through these ports to impact against the second blades.

In each of these designs, the velocity of the water passing over the propeller is the same as or close to the velocity or actual current of the river or stream.

SUMMARY OF THE INVENTION

A basic object of the present invention is to provide a portable water-powered electric generator suited for producing electrical output even in a slow moving water stream.

Another object of the present invention is to provide a portable water-powered electric generator capable of being moved to different debths of water in the stream, effective on the one hand to seek the fastest flowing water in the stream and/or effective on the other hand to be submerged to avoid vessels on the stream passing over the unit.

To achieve these and other objects, the present invention may provide a portable water-powered electric generator unit having water flow control means for accelerating the water before passing it over and through the energy pick-up propeller means, and for then decelerating the water to a speed minimually different from but slightly less than the velocity of the main flow stream before dicsharging it back to such main flow stream. The generator unit further may have bouyancy tank means and means to admit or discharge water from the tank means for adjusting and varying the operating debth of the unit in the stream.

BRIEF DISCRIPTION OF THE DRAWINGS

Further objects, advantages and features of the present invention will appear from the following disclosure, including as a part thereof the accompanying drawing, in which:

FIG. 1 is an elevational sectional view through the portable generator unit, as taken generally from line 1—1 in FIG. 2, and showing also its mooring in a water stream; and FIG. 2 is an elevational view generally of the front or inlet end of the portable generator illustrated in FIG. 1.

DETAILED DESCRIPTION OF AN ILLUSTRATED EMBODIMENT

In FIG. 1, the illustrated portable electric generator unit 10 is adapted to be powered by flowing water such as might be found in a river or stream, near or at some debth below the surface 12. The generator unit 10 is of a tubular form having an inlet end 14 and an outlet end 16 to allow for the passage of water therethrough; and a screen 18 is over the inlet end 14 operable to filter out large solid particles carried in the flowing water.

The generator unit 10 has a somewhat tubular inner flow wall 20 defining a longitudinal path for water flowing between the inlet end 14 and the outlet end 16, the inner wall having a configuration somewhat as a converging-diverging flow venturi including a throat 22 between the inlet and outlet ends.

An electric dynamo is mounted in the portable generator unit 10, having a sealed housing 26 and a driving shaft (not shown) protruding in rotatable sealed relation from the housing; and propeller means 30 is keyed to the shaft outside of the housing. Radial vanes 32 hold the dynamo housing 26 inwardly spaced from the inner wall 20, in the flow path of the water downstream of the throat 22; and the propeller means 30 is supported centered with slight radial clearance within and at the venturi throat 22. The configurations of the inner nozzle wall 22 and dynamo housing 26 combine together to define a major portion of the diverging segment of the flow venturi, immediately downstream from the throat 22 toward the outlet end 16.

A somewhat tubular outer wall 40 is sealed to the inner wall 20, to define a sealed chamber 42 therebetween, disposed annularly of the defined venturi flow path. As illustrated, chamber 42 is nonsymmetrical of the generator unit 10 and flow path, being larger on the top side of the generator unit and the center of the longitudinal flow path.

Valve means 46 is located in the outer wall 40, effective when opened, to connect the chamber 42 with the stream water on the exterior of the generator unit. The valve means 46 is located at the bottom of the generator unit 10, at the smaller portion of the chamber 42 closer to the venturi flow path and diametrically opposite from the large upper portion of the chamber. The valve means 46 is designed to be opened and closed by means remotely of the generator unit 10, and thus should be electrically or phenumatically operated.

The generator unit 10 is designed to be placed in a flowing river or stream, with the inlet end 14 facing the current, as the arrows 48 indicate the flow or current direction of the water. Flexible but nonextendable mooring lines 50 may be used to hold the generator unit 10 axially located in the stream, at least two such lines being illustrated, connected to anchor 52 or the like at the bottom 54 of the stream or at the nearby shore (not shown), and to the generator unit 10 near its vertical center and on its opposite sides. Additional lines (not shown) may also be used to keep the unit longitudinally aligned with the current, or from rotating about its longitudinal flow path, as the stream water flows through the generator unit 10 and rotatably drives the propeller means 30 to generate electrical power.

In this regard, flexible electrically conductive transmission lines 58 are extended from the dynamo and the generator unit 10 to a distribution control or the like (not shown) located on the stream shore 60 near the generator unit 10. The transmission lines 58 may be routed across the water in the venturi flow path, via one of the radial vanes 32, and may be routed from the generator unit 10 along the mooring line 50 to the anchor 52, and can then routed through the stream to its control on the nearby shore.

Also, flexible hose means 62 may connect the chamber 42 to a source of gas, such as a compressor 64 also located on the nearby shore 60; and control line 66 may connect the valve means 46 to a control, such as an electrical power source and switch also located on the nearby shore 60, for use when valve 46 is solenoid actuated. These flexible control and/or transmission lines 58, 62 and 66 can all be routed along a common path with the mooring line 48 to the anchor 50, and can then be routed through the stream to each's respective control located on the nearby shore.

The chamber 42 serves as a buoyancy chamber for the generator unit 10, effective when filled with air, to make the generator unit 10 lighter than the stream water to have the generator unit float at or near the surface 12 of the water. By opening the valve means 46 and decreasing the gas pressure in the buoyancy chamber 42, stream water can enter the chamber to reduce the buoyancy of the generator unit 10, to when the chamber 42 takes on enough water to cause the generator unit 10 to sink in the stream water. To raise the generator unit 10, the air pressure in the chamber 42 can be increased by operation of the compressor 64 to exceed the static water pressure in the stream at the valve means 46, to force the water from the chamber 42 via the opened valve means 46 to increase the buoyancy of the generator unit 10 to raise it in the water stream. When at the proper debth, the valve 46 can be closed and the compressor 64 can be deactivated.

The generator unit 10 can thus be placed at any debth in the stream, such as where the current may be the fastest, typically at or near the surface, or lower in the stream at or near the stream bottom 54; so that a vessel (not shown) for example may pass with clearance over the submerged generator unit 10.

It will be appreciated that the illustrated drawing is out of scale, to exaggerate important features of the disclosed portable electric generator unit 10. Thus, the effective area of the open inlet end 14 is larger than the effective area of venturi throat 22, being between 2-5 times larger. The effective area of the disclosed open outlet end 16 is larger than the effective area of the open inlet end 14, being approximately 1.1-1.5 times larger.

The converging region for the venturi, between the inlet opening 14 and throat 22, will have converging angles of less than approximately 30 degrees, to provide that the throat 22 may be approximately 0.4-1.0 inlet diameters downstream from the inlet end 14. The diverging region for the venturi, between the throat 22 and the outlet opening 16, will have diverging angles of less than approximately 8 degrees, to provide that the outlet end 16 may be approximately 1.5-3.5 inlet diameters downstream from the throat 22.

With the converging-diverging flow venturi defined in the disclosed portable electric generator 10, the flow velocity of the water passing through the throat 22 will thus be speeded up to be faster than the stream velocity entering the inlet opening 14, by almost the same ratio of these areas or approximately 2-5 times faster. This higher water velocity through the propeller means 30 will allow the propeller means to be formed of the velocity or kinetic energy conversion type, where the importance of peripherial seals or the like is reduced. This allows improved efficiencies for providing electrical outputs even with a slow original stream current.

The diverging venturi configuration noted above will gradually reduce the velocity of the water flow at the throat 22 to a slower velocity at the outlet end 16, being slower approximately by the ratio of the outlet area to the throat area. With the outlet end 16 being slightly larger than the inlet end, the velocity of liquid exiting from the outlet end will be slightly less than velocity of the same liquid entering the inlet end 14. The surrounding stream water will be flowing past the generator unit at the outlet end 16 at approximately the same velocity as the inlet velocity, and thus at a velocity faster than the liquid exiting from the outlet end 16 of the generator unit. This slight differential in velocity, will provide a slight negative pressure in the region of the outlet end 16; and will tend to accelerate the exiting water slightly before and as it is blended back into the flow of the stream itself. Again, this allows improved efficiencies for providing electrical outputs with the generator unit 10.

The buoyancy chamber 42 and controls allow the debth of the generator unit 10 to be adjusted in the stream even during use, to seek the fastest current normally at or very near the surface 12 of the stream, or to sink the generator unit below the surface for providing clearance to allow a boat or the like to float over the submerged generator unit.

The generator unit 10 may be portable to the extent that it can be transported about: on land by truck, pack animal, or person; on the water by boat; or by air; and it may be merely placed in a stream of flowing water at the desired location. The generator unit may then be moored by the flexible nonextendable lines, typically extended from submerged or shore line anchors or the like, and several such lines would be used spaced apart across the width of the stream, to properly align and dynamically retain the generator unit in the stream. The control and/or transmission lines would typicalaly be routed in part with these mooring lines, and further then to the on-shore control.

While only a single embodiment of the invenion has been illustrated, it is apparent that variations may be made therefrom without departing from the inventive concept. Accordingly, the invention is to be limited only by the scope of the following claims.

What I claim as my invention is:

1. A portable electric generator unit, adapted to be powered by flowing water as in a stream, comprising the combination of
   a tubular form having an inner wall with opposite open inlet and outlet ends for defining a longitudinal flow path for the water;
   the configuration of said inner wall, from the inlet end thereof, defining a converging venturi terminating at a throat between the inlet and outlet ends;
   an electric dynamo having a sealed housing and driving means protruding in rotatable sealed relation from the housing, and external propeller means keyed to the driving means;
   means holding the housing to the tubular form inwardly spaced from the inner wall and in the flow path, with the propeller means being supported centered with slight radial clearance within and at the throat and with the housing being located downstream of the throat;
   the combined configurations of said inner wall and said housing generally defining a diverging venturi downstream from said throat toward the outlet end;
   said tubular form also having an outer wall sealed over the inner wall and defining a buoyancy chamber therebetween, operable to provide buoyancy of the portable electric generator unit in the stream during use; and
   means to moor the tubular form within the stream so that the moving stream water must flow through the longitudinal flow path.

2. A portable electric generator unit according to claim 1, further including valve means in the outer wall operable to communicate the buoyancy chamber with the exterior stream water, and means operable remotely of the tubular form to open and close the valve means to allow stream water to pass into or from the buoyancy chamber to change the overall buoyancy of the tubular form for selectively floating or sinking the portable electric generator unit.

3. A portable electric generator unit according to claim 2, further including means for connecting a source of gas under pressure to the buoyancy chamber, operable to regulate the amount of water in the buoyancy chamber and the overall buoyancy of the tubular form, for adjusting the operative debth of use of the portable electric generator unit in the stream.

4. A portable electric generator unit according to claim 3, further wherein the buoyancy chamber is annularly arranged relative to the defined longitudinal flow path and throat, but is offset and nonsymmetrical relative thereto, being larger on the top side thereof; and wherein said valve means is on the bottom side of the outer wall.

5. A portable electric generator unit according to claim 1, further wherein the effective area of the open inlet end is larger than the effective area of the venturi throat, being between 2-5 times larger, providing that the flow velocity of the water passing through the throat will be faster than the stream velocity entering the open inlet end, by almost the same ratio of these areas, to impact against and drive the propeller means.

6. A portable electric generator unit according to claim 5, further wherein the propeller means is of the velocity or kinetic energy conversion type.

7. A portable electric generator unit according to claim 6, further wherein the converging region for the venturi, between the open inlet end and throat, has converging angles of less than approximately 30 degrees, to provide that the throat is approximately 0.4–1.0 inlet diameters downstream from the open inlet end.

8. A portable electric generator unit according to claim 6, further wherein the diverging region for the venturi, between the throat and the open outlet end, will have diverging angles of less than approximately 8 degrees, to provide that the open outlet end is approximately 1.5–3.5 inlet diameters downstream from the throat.

9. A portable electric generator unit according to claim 1, further wherein the effective area of the disclosed open outlet end is larger than the effective area of the open inlet end, being between 1.1–1.5 times larger, providing that the surrounding stream water flowing past the generator unit at the outlet end at approximately the same velocity as the inlet velocity, will be at a velocity faster than the water exiting from the open outlet end of the generator unit, this slight differential in velocity providing a slight negative pressure in the region of the open outlet end tending to accelerate the exiting water slightly before and as it is blended back into the flowing water of the stream itself.

10. A portable electric generator unit, adapted to be powered by flowing water as in a stream, comprising the combination of
    a tubular form having an inner wall with opposite open inlet and outlet ends for defining a longitudinal flow path for the water;
    the configuration of said inner wall, from the inlet end thereof, defining a converging venturi terminating at a throat between the inlet and outlet ends, the effective area of the inlet end being larger than the effective area of the venturi throat, being between 2-5 times larger;
    an electric dynamo having a sealed housing and driving means protruding in rotatable sealed relation from the housing, external propeller means keyed to the driving means, and the propeller means being of the velocity or kinetic energy conversion type;
    means holding the housing to the tubular form inwardly spaced from the inner wall and in the flow path, with the propeller means being supported centered with slight radial clearance within and at the throat and with the housing being located downstream of the throat;
    the combined configurations of said inner wall and said housing generally defining a diverging venturi downstream from said throat toward the open outlet end;
    said tubular form also having an outer wall sealed over the inner wall and defining a buoyancy chamber therebetween, operable to provide buoyancy of the portable electric generator unit in the stream during use;
    valve means in the outer wall operable to communicate the buoyancy chamber with the stream water, means operable remotely of the tubular form to open and close the valve means to allow stream water to pass into or from the buoyancy chamber, and means for connecting a source of gas to the buoyancy chamber to change the pressure therein, operable to regulate the amount of water in the buoyancy chamber and the overall buoyancy of the tubular form, for adjusting the operative debth of use in the stream; and means to moor the tubular form within the stream so that the moving stream water must flow through the longitudinal flow path.

11. A portable electric generator unit according to claim 10, further wherein the converging region for the venturi, between the open inlet end and throat, has converging angles of less than approximately 30 degrees; and further wherein the diverging region for the venturi, between the throat and the open outlet end, will have diverging angles of less than approximately 8 degrees.

12. A portable electric generator unit according to claim 11, further wherein the effective area of the disclosed open outlet end is larger than the effective area of the open inlet end, being between 1.1–1.5 times larger, providing that the surrounding stream water, flowing past the generator unit at the outlet end at approximately the same velocity as the inlet velocity, will be at a velocity faster than the water exiting from the open outlet end of the generator unit, this slight differential in velocity providing a slight negative pressure in the region of the open outlet end tending to accelerate the exiting water slightly before and as it is blended back into the flowing water of the stream itself.

* * * * *